United States Patent
Chen

(10) Patent No.: US 7,059,452 B2
(45) Date of Patent: Jun. 13, 2006

(54) BRAKE ASSEMBLY FOR A STROLLER

(75) Inventor: Shun-Min Chen, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 0 days.

(21) Appl. No.: 10/982,720

(22) Filed: Nov. 5, 2004

(65) Prior Publication Data

US 2005/0241890 A1    Nov. 3, 2005

(30) Foreign Application Priority Data

Apr. 30, 2004    (CN)    ............... 2004 2 0042459X

(51) Int. Cl.
  *B62B 9/08*    (2006.01)
  *B62B 7/00*    (2006.01)
(52) U.S. Cl. .................. 188/20; 188/2 D; 188/2 F; 280/47.38; 280/647
(58) Field of Classification Search ............... 188/20, 188/31, 19, 69, 2 D, 2 F, 1.12, 73.1; 280/647–650, 280/47.38, 33.994, 642, 643; 16/35 R
See application file for complete search history.

(56) References Cited

U.S. PATENT DOCUMENTS 5,967,535 A * 10/1999 King ........................ 280/47.38
6,308,805 B1 * 10/2001 Lan .............................. 188/20
6,443,468 B1 * 9/2002 Eros ......................... 280/47.38
2002/0195299 A1 * 12/2002 Cheng .......................... 188/20
2005/0049067 A1 * 3/2005 Hsu .............................. 473/244

FOREIGN PATENT DOCUMENTS

GB    2243198 A    * 10/1991
GB    2283791 A    * 5/1995
GB    2 351 131    12/2000

* cited by examiner

Primary Examiner—Melody M. Burch
(74) Attorney, Agent, or Firm—Christie, Parker & Hale, LLP

(57) ABSTRACT

A brake assembly for a stroller includes left and right braking mechanisms, a connecting member, and left and right operating members interconnected to each other through the connecting member so as to move in opposite directions when operated. Each of the left and right braking mechanisms includes a first engaging member, and a second engaging member movable between a locking position, in which the second engaging member engages the first engaging member, and an unlocking position, in which the second engaging member is disengaged from the first engaging member. Each of the left and right operating members defines a cam face which is in sliding contact with the second engaging member so as to drive the second engaging member to move to the locking position when the left operating member is operated, and so as to drive the second engaging member to move to the unlocking position when the right operating member is operated.

10 Claims, 9 Drawing Sheets

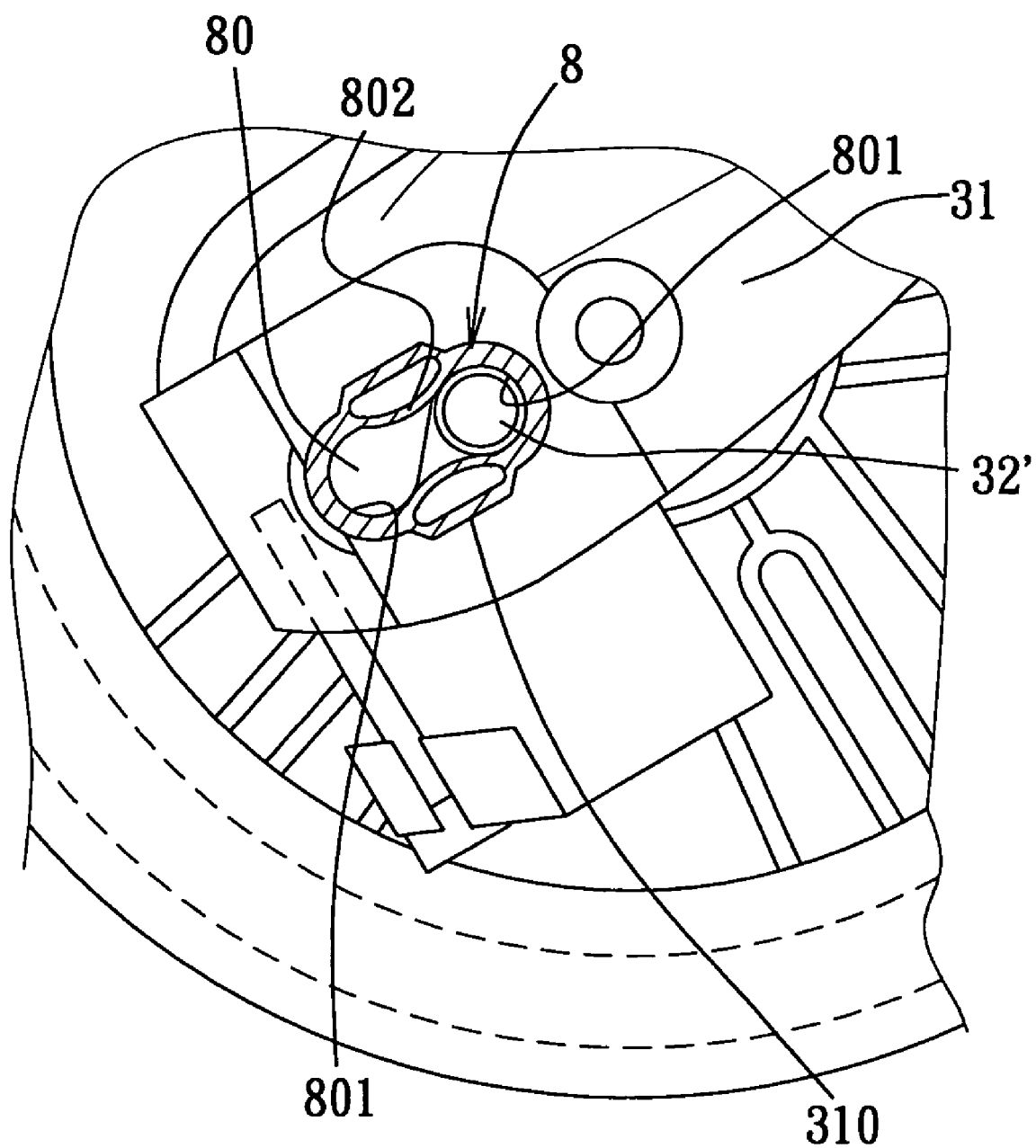
F I G. 12

BRAKE ASSEMBLY FOR A STROLLER

CROSS-REFERENCE TO RELATED APPLICATION

This application claims priority of Chinese Application No. 200420042459X, filed on Apr. 30, 2004.

BACKGROUND OF THE INVENTION

1. Field of the Invention

This invention relates to a brake assembly for a stroller, more particularly to a brake assembly including left and right brake operating members, one of which is operable to actuate left and right braking mechanisms to engage respectively left and right wheels of the stroller, and the other of which is operable to actuate the left and right braking mechanisms to disengage the left and right wheels of the stroller.

2. Description of the Related Art

U.K. Patent Application GB2351131B disclosed a conventional brake assembly for a stroller. The brake assembly includes two braking mechanisms for braking respectively left and right wheels of the stroller, and two operating elements connected respectively to the braking mechanisms and connected to each other through a cable in such a manner that the braking mechanisms are actuated to engage simultaneously and respectively the left and right wheels when one of the operating elements is pressed downwardly by foot and that the braking mechanisms are actuated to disengage simultaneously and respectively the left and right wheels when the other of the operating elements is pressed downwardly by foot. Each braking mechanism includes a crown gear that is mounted on a respective one of the left and right wheels and that defines a plurality of angularly disposed engaging grooves, and an engaging pin that is fixed to a respective one of the operating elements and that is required to be moved together with the respective operating element toward the crown gear in a radial direction relative to an axle, which is connected to the left and right wheels, so as to be able to engage a selected one of the engaging grooves.

The conventional brake assembly is disadvantageous in that since the engaging pin is to be moved together with the respective operating element in the radial direction relative to the axle, each of the operating elements is required to be formed with an elongated radial slot for passage of the axle therethrough and for permitting radial movement relative to the axle. As a consequence, undesired interference between the axle and the operating elements during operation of the operating elements is likely to occur.

The entire disclosure of U.K. Patent Application GB 2 351 131 B is incorporated herein by reference.

SUMMARY OF THE INVENTION

The object of the present invention is to provide a stroller brake assembly that has a cam face and an engaging pin driven by the cam face for actuating or releasing the brake mechanisms of the stroller brake assembly and that is capable of overcoming the aforesaid drawback associated with the prior art.

According to this invention, there is provided a brake assembly for a stroller. The stroller includes a stroller frame assembly and left and right wheels, each of which is connected to the stroller frame through an axle. The brake assembly comprises: left and right braking mechanisms engageable respectively with the left and right wheels for braking the left and right wheels; a connecting member; and left and right operating members to be disposed respectively adjacent to the left and right wheels, adapted to be mounted movably on the stroller frame, and interconnected to each other through the connecting member so as to be movable in opposite directions relative to the stroller frame when operated. The left and right braking mechanisms is adapted to engage respectively and simultaneously the left and right wheels when one of the left and right operating members is operated, whereas the left and right braking mechanisms is adapted to disengage respectively and simultaneously the left and right wheels when the other of the left and right operating members is operated. Each of the left and right braking mechanisms includes a first engaging member adapted to be provided on the respective one of the left and right wheels, and a second engaging member adapted to be mounted movably on the stroller frame and movable relative to the stroller frame between a locking position, in which the second engaging member engages the first engaging member, and an unlocking position, in which the second engaging member is disengaged from the first engaging member. Each of the left and right operating members defines a cam face which is in sliding contact with the second engaging member of the respective one of the left and right braking mechanisms so as to drive the second engaging member to move to the locking position when said one of the left and right operating members is operated, and so as to drive the second engaging member to move to the unlocking position when the other of the left and right operating members is operated.

BRIEF DESCRIPTION OF THE DRAWINGS

Other features and advantages of the present invention will become apparent in the following detailed description of the preferred embodiments of the invention, with reference to the accompanying drawings, in which:

FIG. 12 is a fragmentary side view of the second preferred embodiment of the brake assembly according to this invention.

DETAILED DESCRIPTION OF THE PREFERRED EMBODIMENTS

Figure 1:
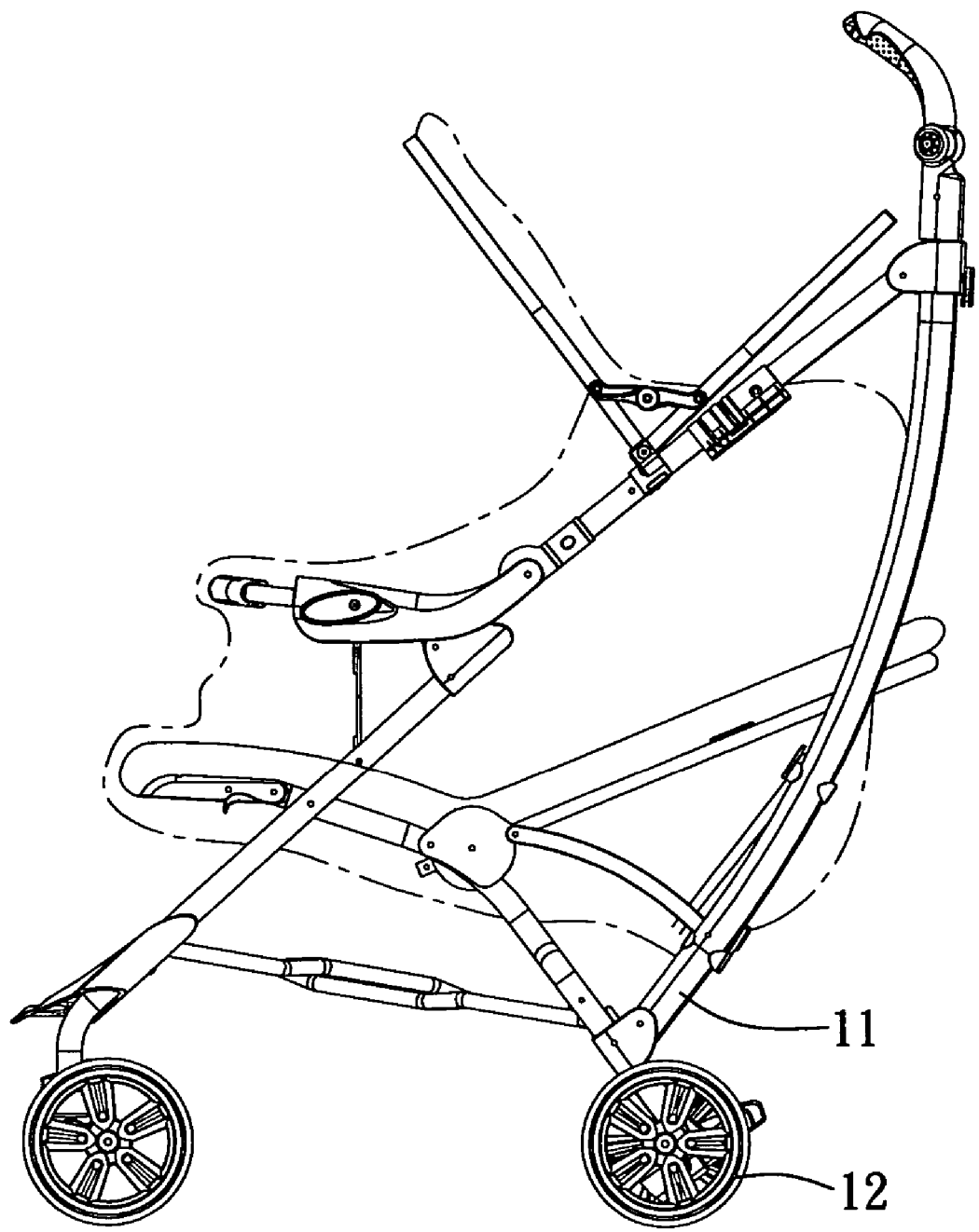
FIG. 1 is a perspective view of the first preferred embodiment of a brake assembly for a stroller according to this invention.
Figure 2:
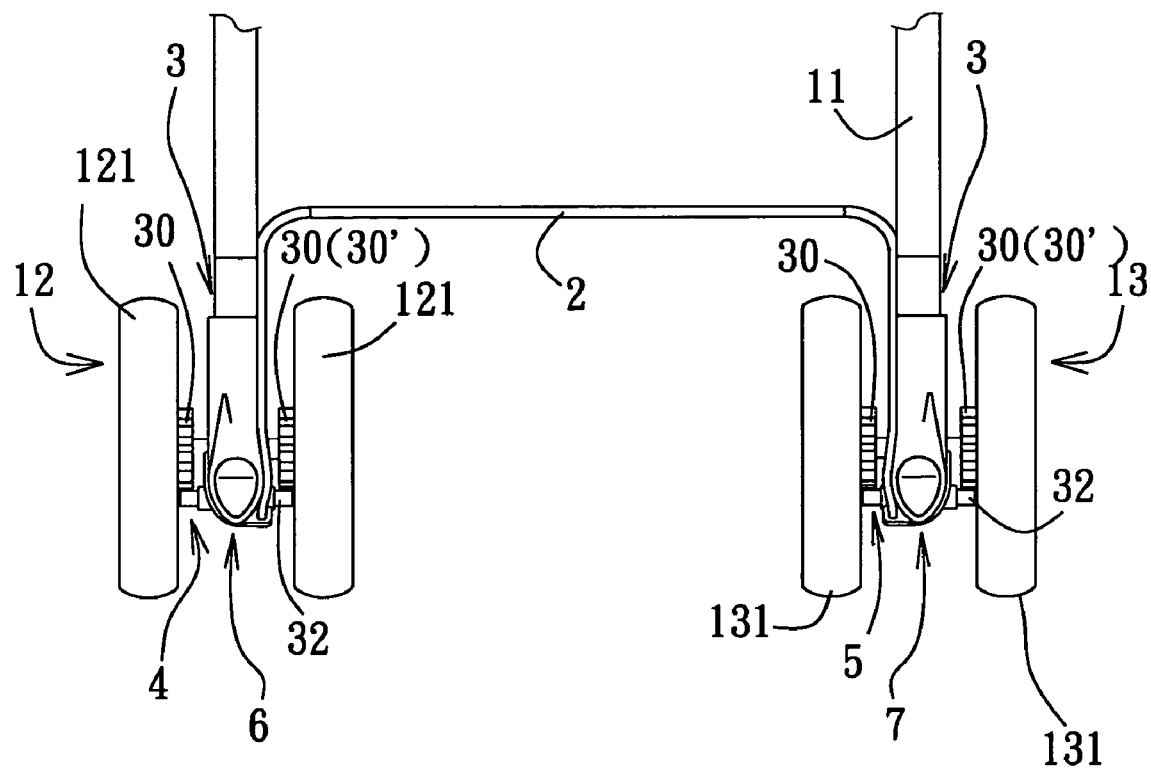
FIG. 2 is a fragmentary rear view of the first preferred embodiment.
Figure 3:
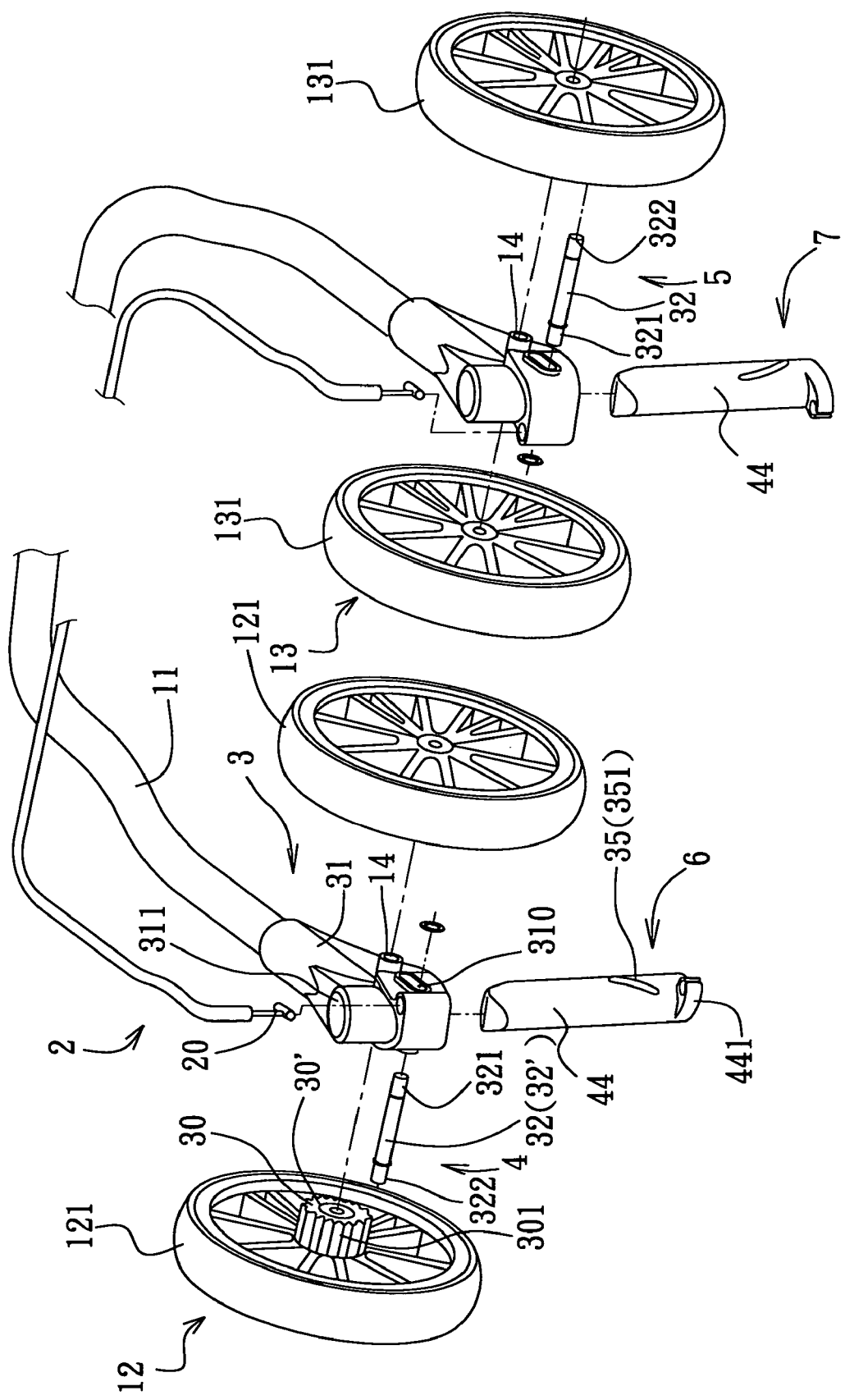
FIG. 3 is a fragmentary exploded perspective view of the first preferred embodiment.

FIGS. 1 to 3 illustrate the first preferred embodiment of a brake assembly for a stroller according to the present invention. The stroller includes a stroller frame 11 and left and right wheel units 12, 13, each of which is connected to the stroller frame 11 through an axle 14 and each of which includes a pair of left wheels 121 and a pair of right wheels 131.

Figure 4:
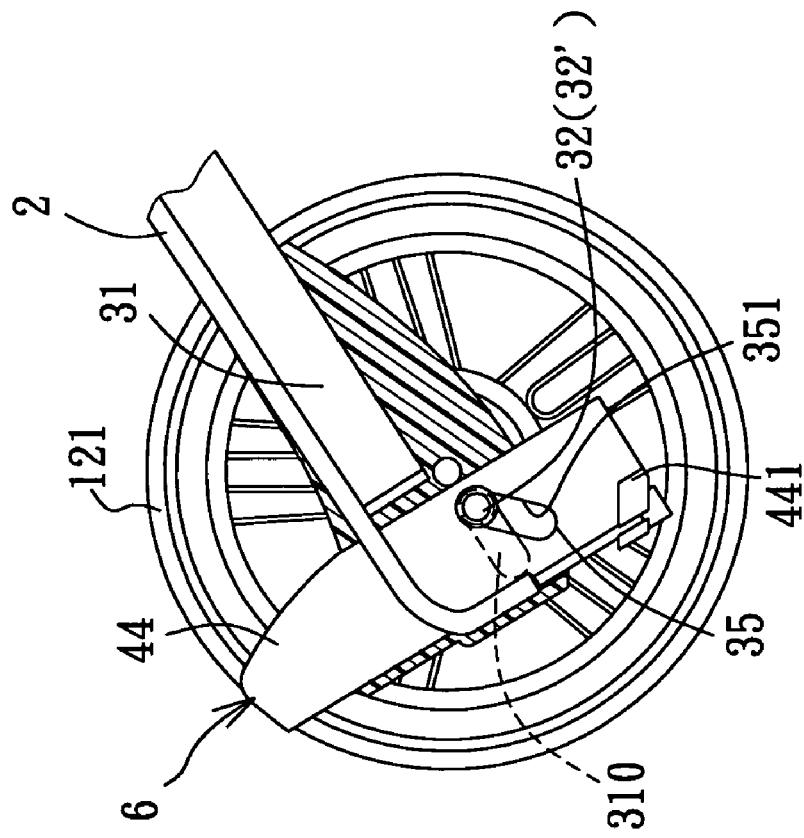
FIGS. 4 and 5 are fragmentary sectional views to illustrate how an engaging pin of a left braking mechanism is moved into an engaging groove in a retaining gear which is mounted on a left wheel of the stroller when a left operating member is operated.
Figure 5:
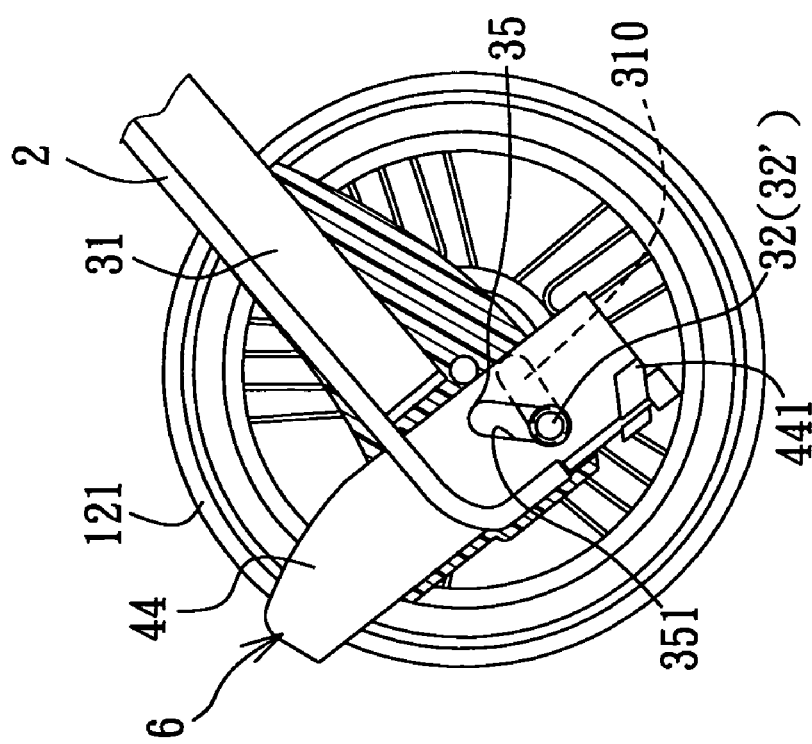
Figure 6:
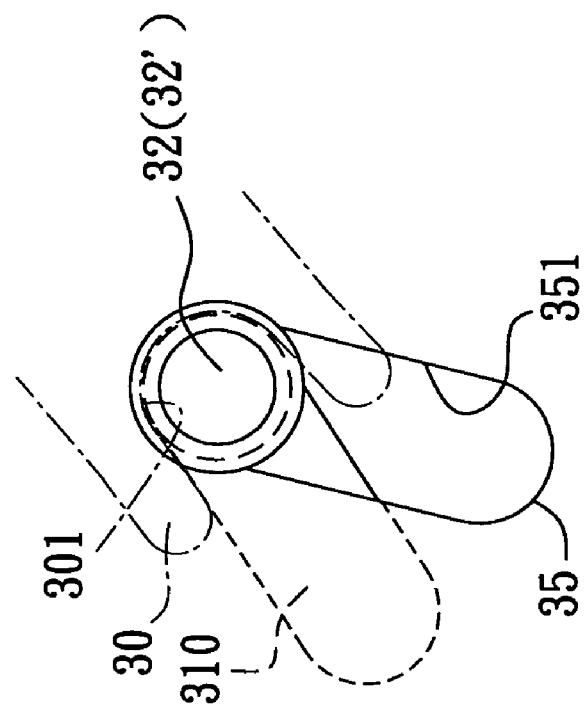
FIGS. 6 and 7 are schematic views corresponding respectively to FIGS. 4 and 5.
Figure 7:
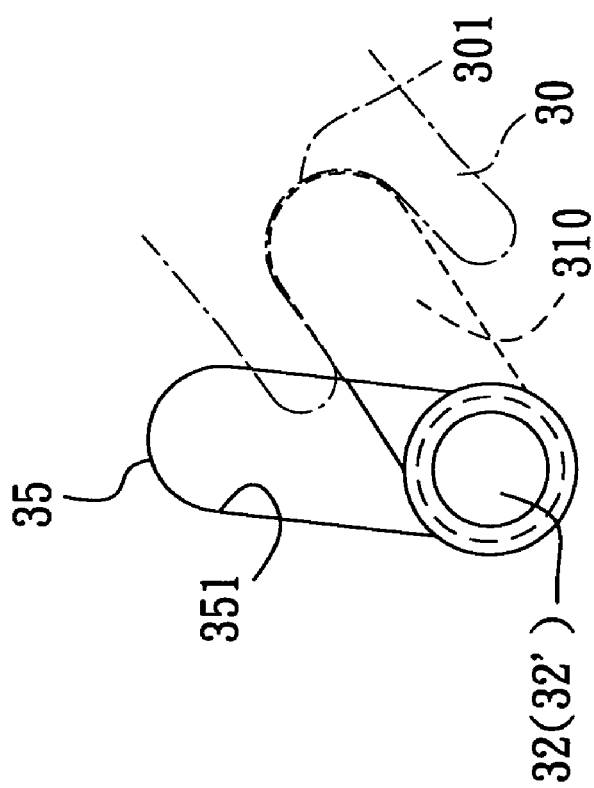
Figure 8:
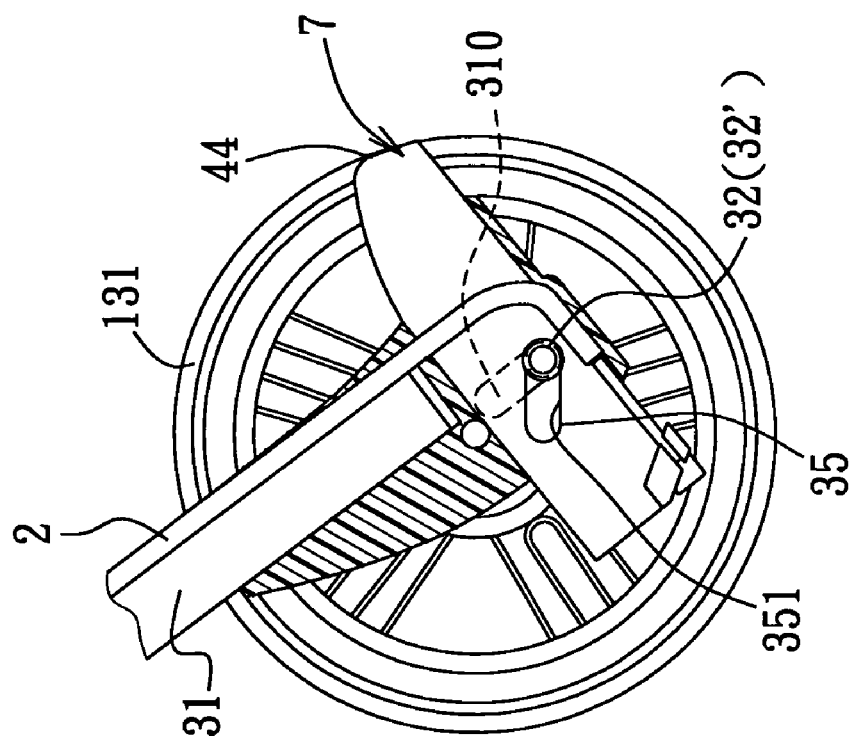
FIGS. 8 and 9 are fragmentary sectional views to illustrate how an engaging pin of a right braking mechanism is moved out of an engaging groove in a retaining gear which is mounted on a right wheel of the stroller when a right operating member is operated.
Figure 9:
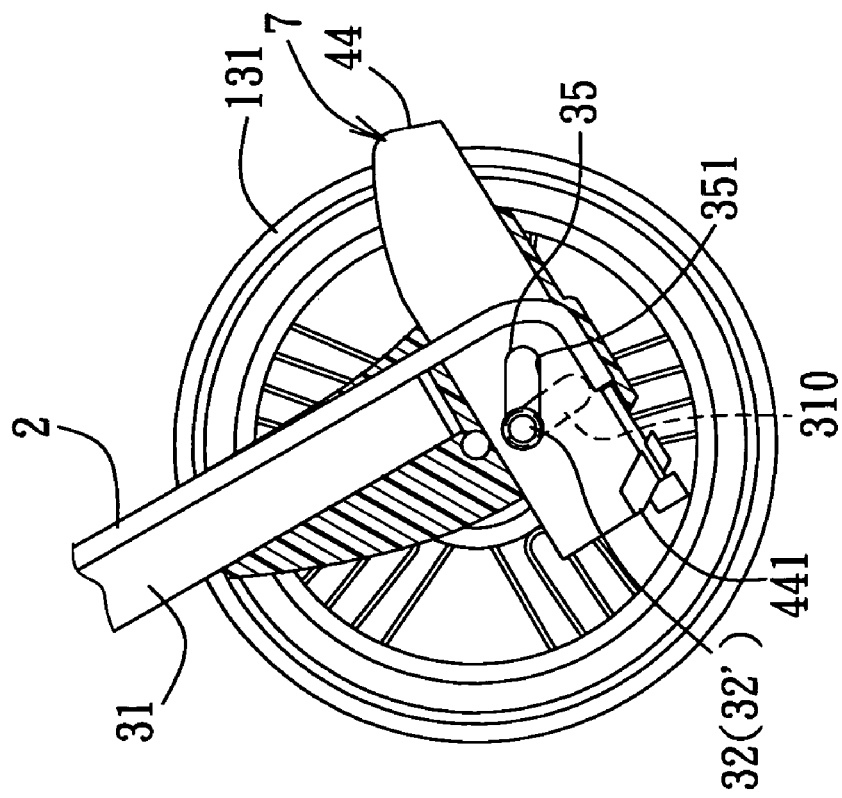
Figure 11:
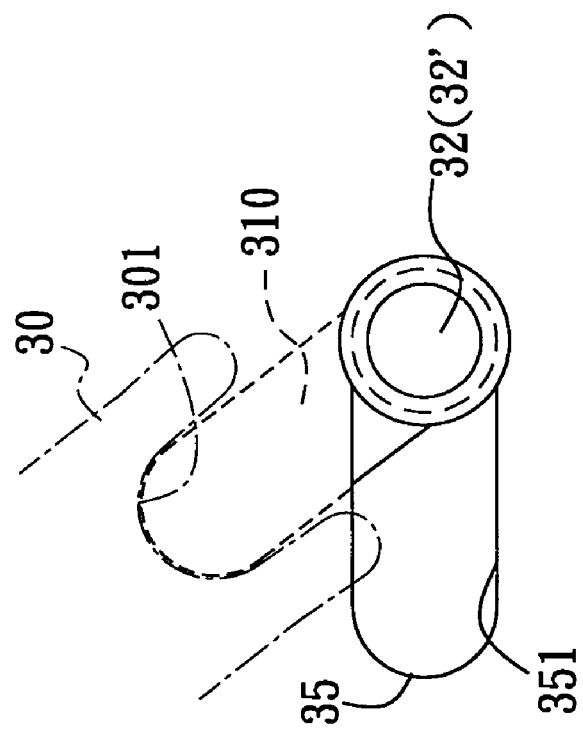
FIGS. 10 and 11 are schematic views corresponding respectively to FIGS. 8 and 9.
Figure 10:
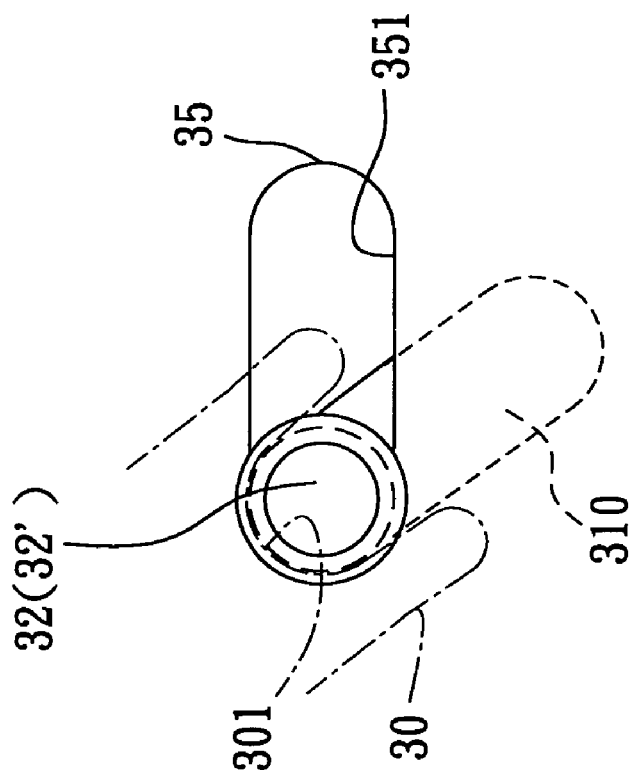

The brake assembly includes: left and right braking mechanisms 4, 5 engageable respectively with the left and right wheel units 12, 13 for braking the latter; a connecting member 2; and left and right operating members 6, 7 to be disposed respectively adjacent to the left and right wheel units 12, 13, adapted to be mounted movably on the stroller frame 11, and interconnected to each other through the connecting member 2 so as to be movable in opposite directions (see FIGS. 4 and 5 and FIGS. 8 and 9) relative to the stroller frame 11 when operated. The left and right braking mechanisms 4, 5 are adapted to engage respectively and simultaneously the left and right wheel units 12, 13 when the left operating member 6 is operated, and are adapted to disengage respectively and simultaneously the left and right wheel units 12, 13 when the right operating member 7 is operated. Each of the left and right braking mechanisms 4, 5 includes a first engaging member 30 adapted to be provided on the respective one of the left and right wheel units 12, 13, and a second engaging member 32 adapted to be mounted movably on the stroller frame 11 and movable relative to the stroller frame 11 between a locking position (see FIGS. 5, 7, 8 and 10), in which the second engaging member 32 engages the first engaging member 30, and an unlocking position (see FIGS. 4, 6, 9 and 11), in which the second engaging member 32 is disengaged from the first engaging member 30. Each of the left and right operating members 6, 7 defines a cam face 351 which is in sliding contact with the second engaging member 32 of the respective one of the left and right braking mechanisms 4, 5 so as to drive the second engaging member 32 to move to the locking position (see FIGS. 5 and 8) when the left operating member 6 is operated, i.e., pressed downwardly by foot (see FIG. 4), and so as to drive the second engaging member 32 to move to the unlocking position (see FIGS. 4 and 9) when the right operating member 7 is operated, i.e., pressed downwardly by foot (see FIG. 8).

In this embodiment, the left and right operating members 6, 7 are guided by left and right guiding members 3 which are adapted to be secured to the stroller frame 11. Each of the left and right guiding members 3 includes a housing 31 that defines a sliding space 311 therein and that is formed with two opposite guiding slots 310 which are in spatial communication with the sliding space 311. Each of the left and right operating members 6, 7 includes an elongated sliding piece 44 that is inserted slidably into the sliding space 311 in the housing 31 of a respective one of the left and right guiding members 3 and that is formed with a cam-defining slot 35 defined by the cam face 351. The second engaging member 32 includes an engaging pin 32' that extends through the guiding slots 310 and the cam-defining slot 35 and that has a driven end 321 in sliding contact with the cam face 351, and an engaging end 322 opposite to the driven end 321 and engageable with the first engaging member 30.

The first engaging member 30 of the left braking mechanism 4 includes a pair of retaining gears 30' that are respectively secured to the left wheels 121. The first engaging member 30 of the right braking mechanism 5 includes a pair of retaining gears 30' that are respectively secured to the right wheels 131. Each of the retaining gears 30' of the first engaging member 30 of each of the left and right braking mechanisms 4, 5 defines a plurality of angularly disposed retaining grooves 301 disposed to extend radially relative to the axle 14. The engaging pin 32' engages a selected one of the retaining grooves 301 when the left operating member 6 is operated, i.e., pressed downwardly by foot, and disengages the selected one of the retaining grooves 301 when the right operating member 7 is operated, i.e., pressed downwardly by foot.

Each of the retaining grooves 301 in each of the retaining gears 30' extends in a radial direction relative to the axle 14. The guiding slots 310 in the housing 31 of each of the left and right guiding members 3 extends in the radial direction and the cam-defining slot 35 and the respective guiding slot 310 form an angle (see FIGS. 6, 7, 10, 11) in such a manner so as to permit the engaging pin 32' to be moved in the radial direction by the cam face 351 when either one of the left and right operating members 6, 7 is operated. Preferably, the sliding piece 44 of each of the left and right operating members 6, 7 is guided by the respective one of the left and right guiding members 3 to move in a transverse direction relative to the radial direction.

The sliding piece 44 has a top end 441 that is disposed outwardly of the sliding space 311 in housing 31 of each of the left and right guiding members 3. The connecting member 2 includes a cable 20 that has two opposite ends connected respectively to the top ends 441 of the sliding pieces 44 of the left and right operating members 6, 7, and that is tensioned between the opposite ends so as to permit the sliding piece 44 of one of the left and right operating members 6, 7 to be moved in an opposite direction opposite to the sliding piece 44 of the other of the left and right operating members 6, 7 when either one of the left and right operating members 6, 7 is operated.

In a braking operation, the left operating member 6 is pressed downwardly by foot (from an upper position shown in FIG. 4 to a lower position shown in FIG. 5), which results in simultaneous upward movement of the right operating member 7 (from a lower position shown in FIG. 9 to an upper position shown in FIG. 8) and radial movement of the engaging pins 32' of the second engaging members 32 along the guiding slots 310 into selected ones of the retaining grooves 301 in the retaining gears 30' of the first engaging members 30 (see FIGS. 7 and 10) due to the pushing action of the cam faces 351 of the cam-defining slots 35, which, in turn, results in braking of the left and right wheel units 12, 13.

In a brake releasing operation, which action has a reversed process from that of the braking operation, the right operating member 7 is pressed downwardly by foot (from the upper position shown in FIG. 8 to the lower position shown in FIG. 9), which results in simultaneous upward movement of the left operating member 6 (from the lower position shown in FIG. 5 to the upper position shown in FIG. 4) and radial movement of the engaging pins 32' of the second engaging members 32 along the guiding slots 310 out of the selected ones of the retaining grooves 301 in the retaining gears 30' of the first engaging members 30 (see FIGS. 6 and 11) due to the pushing action of the cam faces 351 of the cam-defining slots 35, which, in turn, results in releasing of the left and right wheel units 12, 13.

FIG. 12 illustrates the second preferred embodiment of the brake assembly according to this invention. The brake assembly of this embodiment is similar to the previous embodiment, and further includes a retaining unit. The retaining unit includes a retainer 8 that is mounted securely in each of the guiding slots 310 in the housing 31 of each of the left and right guiding members 3, and that defines a pin-retaining slot 80 having two opposite end sections 801 and a neck section 802 extending between and reduced in cross-section from the end sections 801. The engaging pin 32' extends slidingly and fittingly through the pin-retaining slot 80. The neck section 802 of the pin-retaining slot 80 has a cross-section less than that of the engaging pin 32' so as to retain the engaging pin 32' in a selected one of the opposite end sections 801 of the pin-retaining slot 80. The retainer 8 is elastically deformable so as to permit squeezing of the engaging pin 32' therethrough from one of the opposite end sections 801 of the pin-engaging slot 80 to the other of the opposite end sections 801 of the pin-engaging slot 80.

Figure 13:
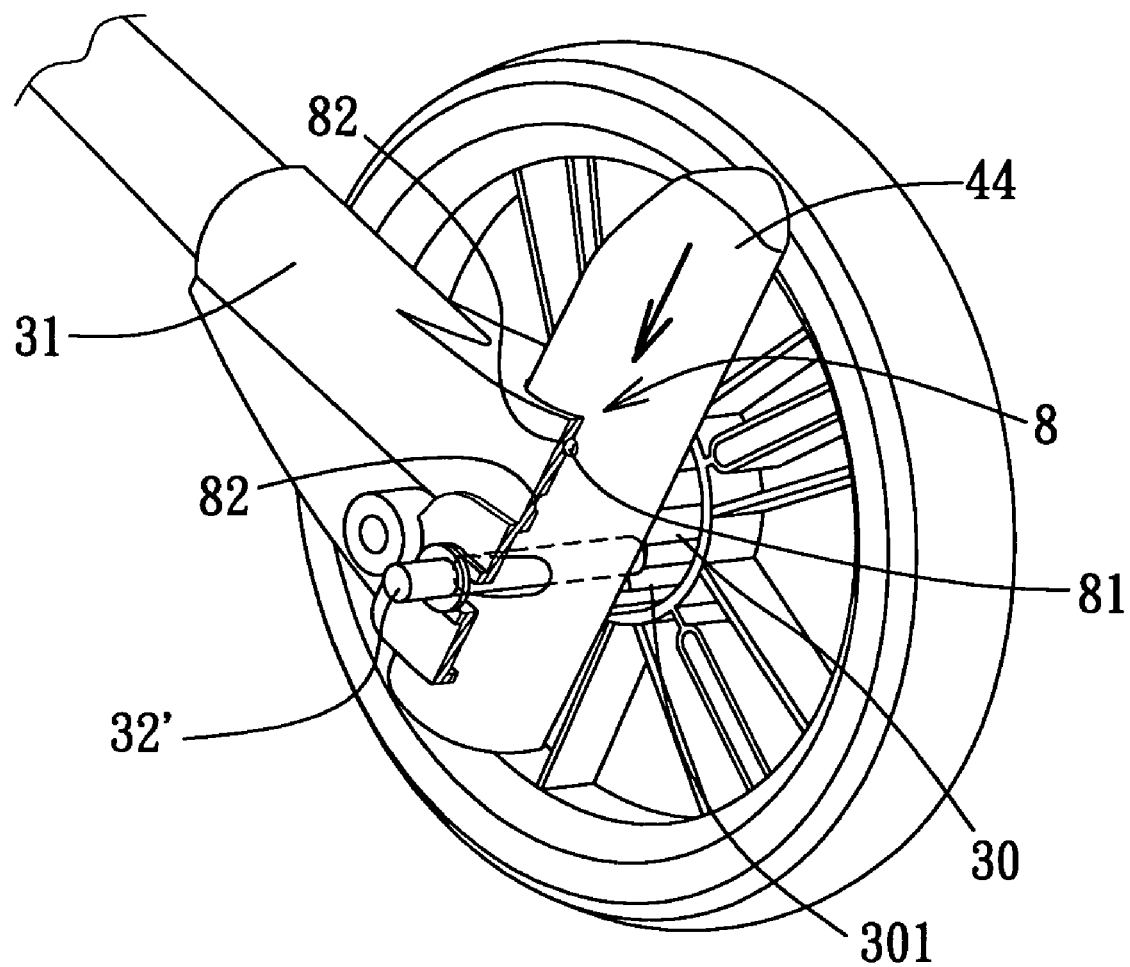
FIG. 13 is a fragmentary perspective view of the third preferred embodiment of the brake assembly according to this invention.

FIG. 13 illustrates the third preferred embodiment of the brake assembly according to this invention. The brake assembly of this embodiment differs from the second embodiment in that the retaining unit has retainers 8, each of which includes a boss 81 that is formed on and that protrudes from the sliding piece 44 of a respective one of the left and right operating members 6, 7, and that engages in a tongue-and-groove manner a selected one of upper and lower recesses 82 formed in an inner wall of the housing 31 of the respective one of the left and right guiding members 3 so as to retain releasably the sliding piece 44 in a desired position.

By virtue of the cam face 351, radial movement of each of the left and right operating members 6, 7 relative to the axle 14 as required in the aforesaid conventional brake assembly can be avoided, thereby eliminating the aforesaid drawback associated with the prior art.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A brake assembly for a stroller, the stroller including a stroller frame and left and right wheels, each of which is connected to the stroller frame through an axle, said brake assembly comprising:
    left and right braking mechanisms engageable respectively with the left and right wheels for braking the left and right wheels;
    a connecting member; and
    left and right operating members to be disposed respectively adjacent to the left and right wheels, adapted to be mounted movably on the stroller frame, and interconnected to each other through said connecting member so as to be movable in opposite directions relative to the stroller frame when operated, said left and right braking mechanisms being adapted to engage respectively and simultaneously the left and right wheels when one of said left and right operating members is operated, said left and right braking mechanisms being adapted to disengage respectively and simultaneously the left and right wheels when the other of said left and right operating members is operated;
    wherein each of said left and right braking mechanisms includes a first engaging member adapted to be provided on the respective one of the left and right wheels, and a second engaging member adapted to be mounted movably on the stroller frame and movable relative to the stroller frame between a locking position, in which said second engaging member engages said first engaging member, and an unlocking position, in which said second engaging member is disengaged from said first engaging member; and
    wherein each of said left and right operating members denies a cam face for driving said second engaging member of the respective one of said left and right braking mechanisms to slide on said cam face between said locking and unlocking positions when the respective one of said left and right operating members is operated.

2. The brake assembly of claim 1, further comprising left and right guiding members adapted to be secured to the stroller frame, each of said left and right guiding members defining a sliding space therein and being formed with two opposite guiding slots which are in spatial communication with said sliding space, each of said left and right operating members including an elongated sliding piece that is slidably inserted into said sliding space in a respective one of said left and right guiding members and that is formed with a cam-defining slot defined by said cam face, said second engaging member including an engaging pin that extends through said guiding slots and said cam-defining slot so as to be driven by said earn face upon movement of said sliding piece.

3. The brake assembly of claim 2, wherein said first engaging member of each of said left and right braking mechanisms further includes a retaining gear that is adapted to be secured to the respective one of the left and tight wheels and that defines a plurality of angularly disposed retaining grooves disposed to extend radially relative to the axle, said engaging pin engaging a selected one of said retaining grooves when said left operating member is operated, said engaging pin disengaging the selected one of said retaining grooves when said right operating member is operated.

4. The brake assembly of claim 2, wherein said connecting member includes a cable that has two opposite ends connected respectively to said sliding pieces of said left and right operating members, and that is tensioned between said opposite ends so as to permit said sliding piece of one of said left and tight operating members to be moved in an opposite direction opposite to said sliding piece of the other of said left and right operating members when either one of said left and right operating members is operated.

5. The brake assembly of claim 3, wherein each of said retaining grooves in said retaining gear extends in a radial direction relative to the axle, said guiding slots in each of said left and right guiding members extending in said radial direction so as to permit said engaging pin to be moved in said radial direction by said earn face when one of said left and right operating members is operated, said sliding piece of each of said left and right operating members being guided by the respective one of said left and right guiding members to move in a transverse direction relative to said radial direction.

6. The brake assembly of claim 5, wherein said connecting member includes a cable that has two opposite ends connected respectively to said sliding pieces of said left and right operating members, and that is tensioned between said opposite ends so as to permit said sliding piece of one of said left and right operating members to be moved in an opposite direction opposite to said sliding piece of the other of said left and right operating members when either one of said left and right operating members is operated.

7. The brake assembly of claim 2, further comprising a retaining unit that is mounted securely on said left and right guiding members for retaining said engaging pin at a desired position.

8. The brake assembly of claim 7, wherein said retaining unit includes a retainer mounted securely in each of said guiding slots in each of said left and right guiding members, said retainer defining a pin-retaining slot having two opposite end sections and a neck sect ion extending between and reduced in cross-section from said end sections, said engaging pin extending slidingly and fittingly through said pin-retaining slot, said neck section of said pin-retaining slot having a cross-section less than that of said engaging pin so us to retain said engaging pin in a selected one of said opposite end sections of said pin-retaining slot, said retainer being elastically deformable so as to permit squeezing of said engaging pin there through from one of said opposite, end sections of said pin-retaining slot to the other of said end sections of said pin-retaining slot.

9. The brake assembly of claim 7, wherein each of said left and right guiding members includes a housing that defines said sliding space and that has an inner wall, said retaining unit having retainers, each of which includes a boss formed on and protrudes from said sliding piece of a respective one of said left and right operating members, and upper and lower recesses that are formed in said inner wall of said housing of a respective one of said left and right guiding members, said boss engaging a selected one of said upper and lower recesses so as to retain releasably said sliding piece at a desired position.

10. A brake assembly for a stroller comprising a left wheel set having a first engaging member and a right wheel set having a first engaging member;

a left braking mechanism coupled to the left wheel set and a right braking mechanism coupled to the right wheel set;

a connecting member mechanically coupled to both the left braking mechanism and the right braking mechanism for operatively moving one of the left and the right braking mechanisms when the other one of the left and the right braking mechanisms is moved;

the left and right braking mechanisms comprising, respectively:

a left guiding member housing and a right guiding member housing each comprising a guide slot comprising a guide slot face positioned along a first plane;

a left sliding piece and a right sliding piece each comprising a cam defining slot having a cam slot face positioned along a second plane and located, at least in part, within the left guiding member housing and the right guiding member housing defining a left braking sub-assembly and a right braking sub-assembly, receptively, and wherein the guide slot and the cam defining slot of both the left and right braking mechanisms are in communication with one another and the first plane and the second plane are at an angle to one another, and wherein a left second engaging member and a right second engaging member arc both moveable by least one of the left sliding piece and the right sliding piece, and wherein the two second engaging members slide along the guide slot face and the cam slot face of the two braking sub-assemblies when any one of the left sliding piece and the right sliding piece is moved.

* * * * *